(12) United States Patent
Baraccani et al.

(10) Patent No.: US 10,384,819 B2
(45) Date of Patent: Aug. 20, 2019

(54) UNIT AND METHOD FOR GROUPING TOGETHER AND ALIGNING CAPSULES

(71) Applicant: GIMA S.P.A., Zola Predosa (BO) (IT)

(72) Inventors: Davide Baraccani, Cotignola (IT); Pierluigi Castellari, Castel San Pietro Terme (IT)

(73) Assignee: GIMA S.P.A., Zola Predosa (IT)

( * ) Notice: Subject to any disclaimer, the term of this patent is extended or adjusted under 35 U.S.C. 154(b) by 0 days.

(21) Appl. No.: 16/083,262

(22) PCT Filed: Mar. 20, 2017

(86) PCT No.: PCT/IB2017/051595
§ 371 (c)(1),
(2) Date: Sep. 7, 2018

(87) PCT Pub. No.: WO2017/163166
PCT Pub. Date: Sep. 28, 2017

(65) Prior Publication Data
US 2019/0077529 A1   Mar. 14, 2019

(30) Foreign Application Priority Data

Mar. 25, 2016   (IT) .......................... 102016000031694

(51) Int. Cl.
*B65G 47/84* (2006.01)
*B65B 35/16* (2006.01)
(Continued)

(52) U.S. Cl.
CPC ............ *B65B 29/022* (2017.08); *B65B 35/16* (2013.01); *B65B 35/18* (2013.01); *B65B 35/26* (2013.01);
(Continued)

(58) Field of Classification Search
CPC .. B65G 47/846; B65G 47/848; B65G 47/252; B65G 47/24; B65G 47/248; B65D 85/62; B65B 36/16; B65B 35/18; B65B 35/56; B65B 57/14; B65B 35/26; B65B 7/2807; B65B 7/2842

USPC ...................... 198/478.1, 407, 408
See application file for complete search history.

(56) References Cited

U.S. PATENT DOCUMENTS 3,143,223 A * 8/1964 McIntyre ................ B65B 35/56
414/788.3
3,987,605 A * 10/1976 Johnson .................. B65B 11/34
53/234
(Continued)

FOREIGN PATENT DOCUMENTS

| EP | 1871670 A2 | 1/2008 |
|----|-----------|--------|
| WO | WO2006088362 A2 | 8/2006 |
| WO | WO2014040960 A1 | 3/2014 |

OTHER PUBLICATIONS

International Search Report dated May 26, 2017 from counterpart PCT App No. PCT/IB2017/051595.

*Primary Examiner* — James R Bidwell
(74) *Attorney, Agent, or Firm* — Shuttleworth & Ingersoll, PLC; Timothy J. Klima

(57) ABSTRACT

A unit for grouping together and aligning capsules for extraction or infusion products including a first rotary unit equipped with first seats for receiving capsules designed to receive respective capsules from a transport element of a machine for forming capsules; a second rotary unit operating in conjunction with the first rotary unit to receive from the latter, in a predetermined transfer region, capsules and equipped with a first rotary element equipped with respective second seats receiving capsules and a second rotary element equipped with respective third seats for receiving capsules, with the first and second rotary elements which can be rotated independently in the same direction of rotation for picking up, alternately and in succession, capsules from the first rotary unit.

13 Claims, 6 Drawing Sheets

(51) Int. Cl.
  *B65B 35/18*      (2006.01)
  *B65B 35/26*      (2006.01)
  *B65B 29/02*      (2006.01)
  *B65D 85/62*      (2006.01)
  *B65B 57/14*      (2006.01)
  *B65B 35/56*      (2006.01)

(52) U.S. Cl.
  CPC .............. *B65B 35/56* (2013.01); *B65B 57/14* (2013.01); *B65D 85/62* (2013.01); *B65G 47/848* (2013.01)

(56) References Cited

U.S. PATENT DOCUMENTS

| | | | |
|---|---|---|---|
| 4,002,005 A | | 1/1977 | Mueller et al. |
| 4,771,589 A | * | 9/1988 | Mueller ................ B65B 21/025 198/404 |
| 5,435,431 A | * | 7/1995 | Baum .................. B65G 47/252 198/399 |
| 5,493,847 A | * | 2/1996 | Spatafora ................ B65B 11/32 53/234 |
| 5,927,473 A | * | 7/1999 | Draghetti ................ B65B 35/26 198/474.1 |
| 7,770,712 B2 | * | 8/2010 | McCabe ........... A61F 13/15764 198/463.1 |
| 7,975,584 B2 | * | 7/2011 | McCabe ........... A61F 13/15723 53/462 |
| 2008/0217216 A1 | * | 9/2008 | De Vlaam ............. A01K 43/00 209/510 |
| 2016/0009427 A1 | * | 1/2016 | Rea ........................ B65B 29/02 53/282 |

* cited by examiner

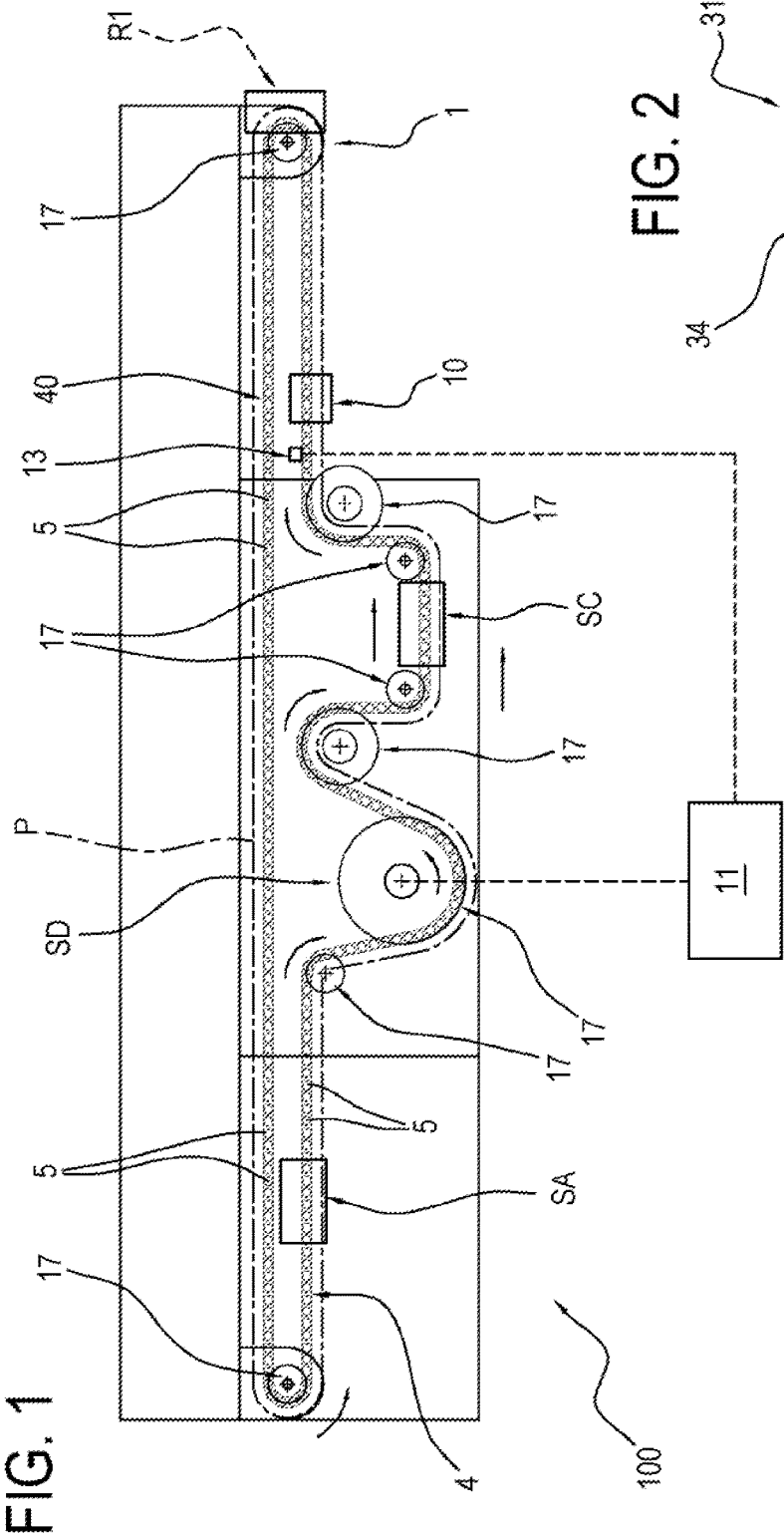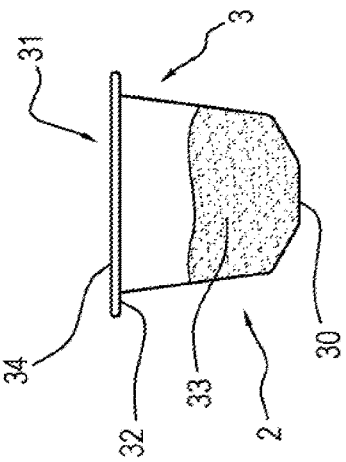

UNIT AND METHOD FOR GROUPING TOGETHER AND ALIGNING CAPSULES

This application is the National Phase of International Application PCT/IB2017/051595 filed Mar. 20, 2017 which designated the U.S.

This application claims priority to Italian Patent Application No. 102016000031694 filed Mar. 25, 2016, which application is incorporated by reference herein.

TECHNICAL FIELD

This invention relates to a unit and a method for grouping together and aligning capsules for extraction or infusion beverages.

BACKGROUND ART

As is known, a strongly felt need in the sector for packaging capsules is that of inserting the capsules in boxes in a predetermined configuration.

The machines referred to in this description are designed to package capsules comprising, in a minimum configuration:
- a rigid, cup-shaped container, for example of a truncated cone shape, which defines a longitudinal axis of the capsule, with a perforatable or perforated bottom and an upper opening equipped with an outer edge;
- a dose of extraction or infusion beverage product contained in the rigid container; and
- a web for sealing the upper opening of the rigid container, either perforated or designed to be perforated by a nozzle which supplies liquid under pressure.

The capsules of the type illustrated may comprise one or more filtering elements, of the rigid or flexible type, or elements for distributing the liquid under pressure and/or the beverage obtained.

The capsules of the type illustrated are typically located on the market in multi-capsule packages, that is to say, packages containing more than one capsule. These multi-capsule packages can be boxes, cartons, flow packs, etc. In these multi-capsule packages it is known to arrange the capsules alongside each other and rotated by 180° about an axis perpendicular to the longitudinal axis of the capsule, in order to save space. In the multi-capsule packages, the capsules are then positioned with the respective longitudinal axes parallel to each other and oriented in the opposite direction, so as to be arranged in a head/tail orientation.

Patent document WO2014/040960 by the Applicant describes a machine designed to allow the grouping together of capsules according to a predetermined position oriented in opposite directions, that is to say, which are positioned head tail, for the purposes of the subsequent boxing.

That machine describes a technical solution wherein a chain conveyor element releases the capsules to a wheel for receiving capsules, actuated in a synchronised fashion with the conveyor element to receive from it the capsules.

The wheel for receiving capsules comprises a plurality of radial seats, each designed to receive a capsule.

At least a part of radial seats are rotating relative to a respective radial axis, so as to be able to vary the orientation of the axis of the capsule and turn the latter through 180° (in this way the bottom of the capsule is facing upwards and the cover downwards).

It should be noted that, during the transportation of the capsules, if a radial seat completes the above-mentioned rotational movement, the adjacent one does not perform the rotational movement: in this way, the capsules are released from the receiving wheel according to a predetermined alternating configuration (a capsule facing upwards and the next facing downwards).

The receiving wheel releases the capsules to a subsequent feed line, where the capsules are substantially aligned for being released, in groups, inside a box.

The capsules having unsuitable quality characteristics (incorrect weight, unsuitable sealing) are not conveyed to the feed line: a rejection station, located upstream of the feed line, rejects the capsules with unsuitable quality.

It should be noted that, generally, if a capsule does not have a quality suitable for being boxed, the adjacent capsule (positioned oriented with the head and bottom in opposite direction) is also normally rejected: in effect, as is known, the capsules must be positioned in the box in pairs oriented in an alternating fashion, where each pair consists of a capsule with the bottom facing downwards and another with the bottom facing upwards.

In this context, since the means for movement of the capsules are actuated substantially continuously and cannot substantially be stopped (due to difficulties with these means moving in a synchronised fashion when restarting), where there is a capsule with quality characteristics unsuitable for boxing, the entire group of capsules destined for the box are rejected.

A strongly felt need in the sector in question is that of providing a machine which allows the boxing of capsules with high productivity.

A further requirement is also that of reducing the rejects where a capsule with quality characteristics not suitable for boxing is identified.

DISCLOSURE OF THE INVENTION

The aim of this invention is to provide a machine and a method for grouping together and aligning capsules designed to be positioned in multi-capsule packages, where the capsules are positioned alongside and oriented in opposite directions, which is fast, practical and reliable.

Yet another aim of this invention is to provide a machine and a method for grouping together and aligning capsules designed to be positioned in multi-capsule packages, where the capsules are positioned alongside and oriented in opposite directions, which allows the rejects to be reduced when capsules with quality characteristics not suitable for boxing are identified.

These aims are achieved by a unit and a method for grouping together and aligning capsules according to the present disclosure. Preferred aspects of the invention are illustrated in the present disclosure.

BRIEF DESCRIPTION OF THE DRAWINGS

The invention is now described with reference to the accompanying drawings, provided by way of example only and without limiting the scope of the invention, in which:

FIG. 1 illustrates a machine for forming capsules;

FIG. 2 illustrates a capsule for extraction or infusion beverages;

DETAILED DESCRIPTION OF PREFERRED EMBODIMENTS OF THE INVENTION

Figure 3:
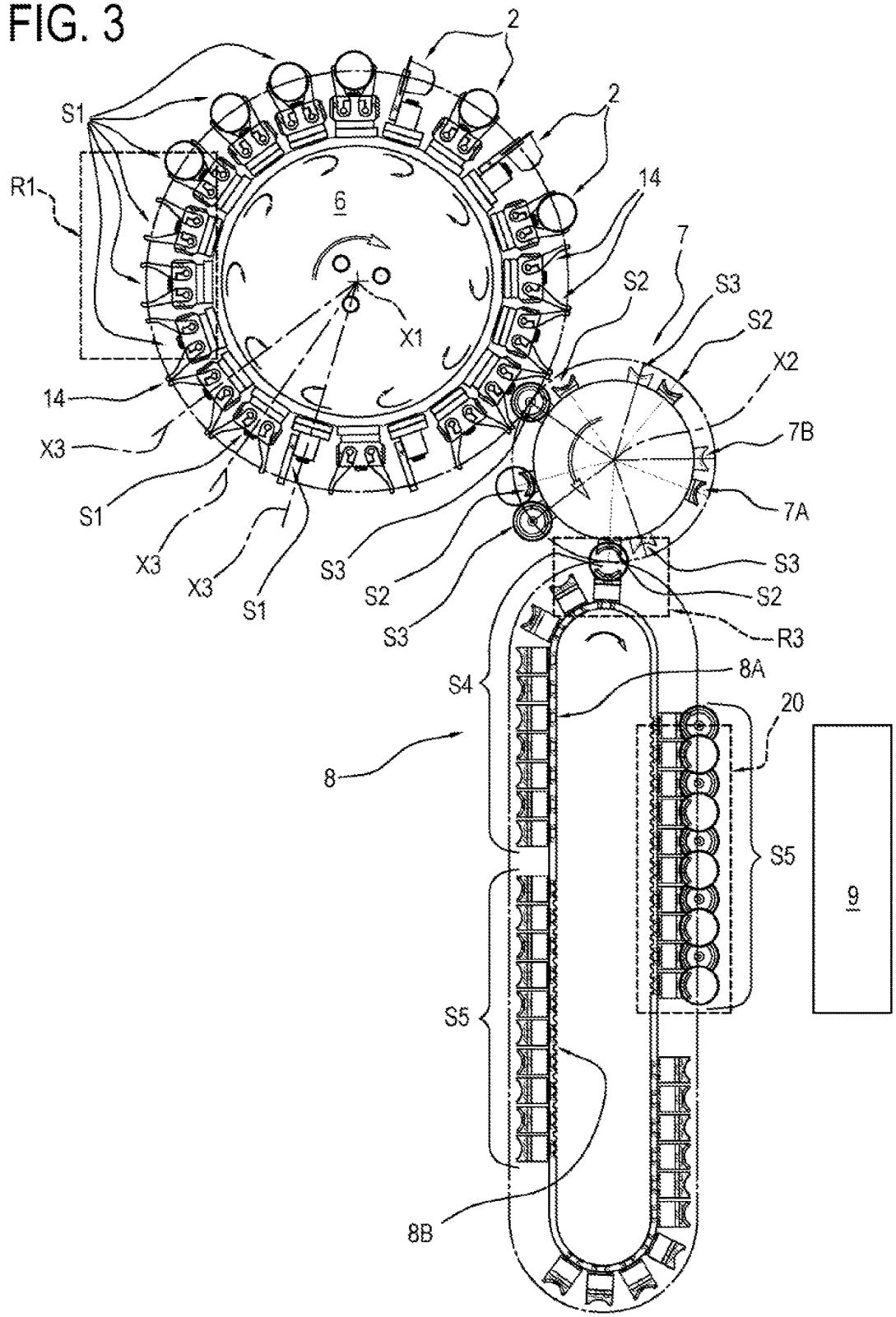
FIGS. 3 to 6 are schematic views from above of a unit for grouping together and aligning capsules according to the invention, which can be coupled to the machine of FIG. 1, at different moments in time.

FIG. 1 shows a machine 100 for forming capsules 2 to which is connected a unit 1 for grouping together and aligning these capsules 2, in particular a unit for grouping together and aligning capsules 2 for extraction or infusion products (e.g. tea, coffee, infusions, herbal tea) intended to be packed in multi-capsule packages.

The machine 100 comprises a transport element 4 which has a plurality of seats 5 for housing and moving the capsules 2 formed along a conveying path P.

The transport element 4 also comprises a chain 40, to which the seat 5 are fixed.

The chain 40 extends along the conveying path P.

The transport element 4 also comprises a plurality of rotary elements 17, designed to mesh with the chain 40, for moving it and/or supporting it along the conveying path P.

According to the invention, the unit 1 comprises a first rotary unit 6, designed to rotate about a first axis of rotation X1 (advantageously vertical) and equipped with a plurality of first seats S1 for receiving capsules 2 designed to receive a corresponding capsule 2 from the transport element 4 of the machine 100. More specifically, the first rotary unit 6 is operatively coupled to the transport element 4 at a predetermined portion R1 of the conveying path P.

At least a part (preferably every other one) of the first seats S1 of the first rotary unit 6 is designed to rotate about a respective horizontal radial axis X3 so as to modify the orientation of the corresponding capsules 2.

The first rotary unit 6 comprises a rotary body 15, designed to be rotated around the first axis X1.

The first seats S1 are radial seats, supported by the rotary body 15.

Each first seat S1 comprises a gripper 14, movable between a non-operating position for opening and an operating position for closing, wherein it is designed to grip and hold a capsule 2.

Preferably, the first seats S1 designed to rotate about the respective horizontal radial axis X3 are spaced by a first fixed seat S1, that is to say, not rotatable about the respective horizontal radial axis X3.

More precisely, each first seat of the above-mentioned part of first seats S1 designed to rotate about the respective horizontal radial axis X3 is hinged to the body 15.

Alternatively, all the first seats S1 may be configured to rotate about the respective horizontal radial axis X3.

According to another aspect, the unit 1 comprises a second rotary unit 7 designed to rotate about a second axis X2 of rotation, parallel to the first axis X1 of rotation (advantageously vertical), acting in conjunction with the first rotary unit 6 to receive from it, in a predetermined transfer region R2 (FIG. 5), capsules 2.

The second rotary unit 7 is equipped with a first rotary element 7A designed to rotate about the second axis of rotation X2 and equipped with respective second seats S2 for receiving capsules 2 and a second rotary element 7B designed to rotate about the second axis of rotation X2 and equipped with respective third seats S3 for receiving capsules 2.

The first and second rotary elements (7A, 7B) can be rotated independently (at different rotational speeds) in the same direction W of rotation for picking up alternatively and in succession (that is to say, alternately first one and then the other) capsules 2 from the first rotary unit 6.

Preferably, the unit 1 comprises a first actuator unit (that is, a drive motor) designed to rotate the first rotary element 7A and a second actuator unit (that is, a drive motor) designed to rotate the second rotary element 7B.

It should be noted that, preferably, the first rotary element 7A is located above the second rotary element 7B.

It should also be noted that, preferably, the second seats S2 and third seats S3 are positioned and movable substantially at the same operational height, having, in effect, to engage with the first seats S1 of the first rotary unit 6—at the transfer region R2 at the same height.

It should also be noted that the second seats S2 and the third seats S3 are configured to pneumatically retain the capsules 2. Alternatively, in equivalent embodiments not illustrated, the second seats S2 and the third seats S3 may comprise grippers or similar gripping devices for mechanically retaining the capsules 2.

Preferably, the second seats S2 and the third seats S3 are equipped with a conduit 16 designed to be put in fluid communication selectively with a low pressure source.

In effect, according to the invention, the first rotary element 7A and the second rotary element 7B are rotated independently: this means that these rotary elements (7A, 7B) can be driven, at the same instant, even at different speeds of rotation.

According to another aspect of the invention, the unit 1 comprises at least one grouping together and aligning line 8 designed to group together and align capsules 2, acting in conjunction with the second rotary unit 7 to receive, in a receiving region R3, capsules 2 from the first and second rotary element (7A, 7B) alternately (that is to say, once from one rotary element and once from the other rotary element), so as to form a group of capsules 2.

It should be noted that the group of capsules 2 formed in the grouping together and aligning line 8 will be inserted inside a multi-capsule package, preferably a box.

The line 8 for grouping together and alignment is equipped with respective seats (S4, S5) for housing the capsules 2.

According to one aspect, the line 8 for grouping together and aligning capsules comprises a first conveyor unit 8A equipped with fourth seats S4 for receiving capsules 2 and a second conveyor unit 8B equipped with fifth seats S5 for receiving capsules.

The first conveyor unit 8A and the second conveyor unit 8B are designed to move the fourth seats (S4) and the fifth seats (S5), respectively, along a closed path between the delivery region 20 and the reception region R3 alternately between each other (that is to say, when the fourth seats of the first conveyor unit 8A are in the delivery region 20, the fifth seats of the second conveyor unit 8B are in a different position).

Preferably, the first conveyor unit 8A is positioned above the second conveyor unit 8B.

It should be noted that, according to one aspect, the first conveyor unit 8A and the second conveyor unit 8B move, that is to say, they are designed to be driven in motion, independently of each other.

It should be noted that, according to another aspect, the first conveyor unit 8A and the second conveyor unit 8B are actuated in a synchronised fashion with the first rotary element 7A and with the second rotary element 7B.

As described in more detail below, where the operation of the unit 1 is described, in the case of a single pair of missing capsules 2 (but also in the case of more than one pair of consecutive missing capsules 2) both the first rotary element 7A and the second rotary element 7B as well as the first and second conveyor unit (8A; 8B) are slowed down or stopped so as to await the next capsule which will be released by the first rotary unit 6.

It should be noted in particular that the fact that the first and the second conveyor unit (8A; 8B) are driven independently to each other means that whilst one of the two conveyor units (8A; 8B) is stationary in the delivery region 20 so that a group of capsules already formed can be transferred to a boxing station 9, the other one can be, for example, slowed down or stopped awaiting a capsule from the first or second rotary unit (because a capsule 2 has been rejected).

It should also be noted that, preferably, the fourth seats S4 of the first conveyor unit 8A and the fifth seats S5 of the second conveyor unit 8B are positioned and movable substantially at the same operational height, having, in effect, to engage with the second seats S2 of the first rotary element 7A and with the third seats S3 of the second rotary element 7B at the receiving region R3.

It should also be noted that, preferably, the first conveyor unit 8A comprises a plurality of groups of fourth seats S4 and the second conveyor unit 8B comprises a plurality of groups of fifth seats S5, where each group comprises seats (S4, S5) designed to group together a number of capsules 2 which will be inserted in the box.

In FIGS. 3 to 6 each conveyor unit (8A; 8B) comprises two groups of seats (S4, S5).

It should be noted that each conveyor unit (8A; 8B) comprises, preferably, a belt 21, or chain, or similar element, to which are fastened the seats (S4, S5) to be conveyed along the closed path of the line 8.

Preferably, the seats S4, S5 are in fluid connection with a source of low pressure, to allow the retaining of the capsules 2 by suction.

It should be noted that, according to the invention, each group of seats (S4, S5) of the conveyors (8A, 8B) have capsules 2 in the same mutual configuration that the capsules 2 have in the multi-capsule package.

In light of this, the boxing station 9 comprises a transfer device (not illustrated) for transferring the capsules from the grouping together and aligning line 8, in particular from the delivery region 20, to a multi-capsule package. The transfer device may comprise one or more moving parts, for example robots or pick & place devices.

Since the groups of seats (S4, S5) position the capsules 2 already in the mutual configuration which the capsules 2 have in the multi-capsule package, the transfer device is particularly simple, as the latter only transfer the capsules, without modifying the mutual configuration.

The boxing station 9 comprises a device for feeding a multi-capsule package, inside of which is inserted a group of capsules 2 (composed of a predetermined number of capsules positioned, relative to each other, in a head-tail configuration).

Advantageously, the multi-capsule package is a box.

According to yet another aspect, the unit 1 at least one sensor 13 designed to detect at least one quality parameter of the capsules 2 and to control a rejection station 10, configured for rejecting capsules 2 which do not conform on the basis of the parameter detected by the at least one sensor 13, the rejection station 10 being located upstream of the second rotary unit 7.

It should be noted that examples of quality parameters might be the following:
  the weight of the dose of extraction or infusion product inserted inside the capsule 2;
  the surface condition of the capsule 2 (base 30 and/or upper cover 34 and/or side walls).

Preferably, the rejection station 10 comprises a device for picking up capsules (not illustrated) configured to pick up capsules to be rejected from the seats 5 of the transport element 4.

In a preferred embodiment, the capsules to be rejected are not transferred from the transport element 4 to the first rotary unit 6 giving commands to the grippers 14 not to pick up these capsules, which therefore remain on the transport element 4 from where they are then rejected in a rejecting area located downstream of the portion R1 of the conveying path P.

As described in more detail below, in the case of a capsule 2 of unsuitable quality, an adjacent capsule forming part of the pair is normally rejected.

Alternatively, the capsule 2 to be rejected and, preferably, also the adjacent capsule 2, are rejected directly at the first rotary unit 6, simply opening the grippers 14 which hold the capsules to be rejected, during the transfer of these capsules to be rejected towards the second rotary unit 7. In this way, the capsules 2 to be rejected not are transferred to the second rotary unit 7. In short, the rejection station 10 is made in the first rotary unit 6.

According to another aspect, a control and operating unit 11 is operatively connected to, and controls, the first rotary unit 6, the second rotary unit 7, and the line 8 for grouping together and aligning capsules 2.

Advantageously, the control unit 11 is configured to control the first rotary unit 6, in particular to control the opening and closing of the grippers 14, as a function of the parameter detected by the at least one detection sensor 13.

Preferably, the control unit 11 is configured to command (adjust the speed of) the first rotary element 7A and/or the second rotary element 7B as a function of the parameter detected by the at least one detection sensor 13 so as to vary the speed of rotation of the first rotary element 7A and/or the second rotary element 7B as a function of the parameter detected.

In other words, if the parameter measured indicates that the capsule 2 must be rejected (and is therefore rejected in the rejection station 10, or in the first rotary unit 6), the control unit 11 adjusts the speed of the first rotary element 7A and/or the second rotary element 7B at least at the same time as or after the movement in the transfer region R2 of the first seat S1 of the first rotary unit 6 which is empty due to a capsule rejected in the rejection station 10 (or in the first rotary unit 6), as a result the parameter measured.

According to another aspect, the control and actuator unit 11 is configured to slow down the speed of rotation of the first rotary element 7A and/or the second rotary element 7B (or, if necessary, stop the motion) at the same time as the movement in the transfer region R2 of a receiving seat S1 of the first rotary unit 6 which is empty on account of a capsule 2 rejected in the rejection station 10 (or in the first rotary unit 6).

According to another aspect, the control and operating unit 11 is configured to slow the speed of rotation of the first conveyor unit 8A and/or the second conveyor unit 8B (or, if necessary, stop the movement completely) following the rejection of a capsule 2.

In other words, the rejection of a capsule or of one or more pairs of capsules means that even the first conveyor unit 8A and/or the second conveyor unit 8B can be slowed down (or be stopped), whilst waiting for the first rotary element 7A and/or the second rotary element 7B to release the capsules necessary for the complete filling of a group of seats (S4, S5).

It should be noted that the first conveyor unit 8A and/or the second conveyor unit 8B are actuated in a synchronised fashion with the first rotary element 7A and/or the second rotary element 7B.

Described below, with reference to FIGS. 3 to 6 (which illustrate the unit 1 in successive points in time), is the operation of the unit 1 if a pair of capsules 2 has been rejected, from which some advantageous technical aspects of the invention can be seen.

FIG. 3 shows the situation in which a pair of capsules 2 has been rejected (in the rejecting station 10, not illustrated, or in the first rotary unit 6).

In effect, the first rotary unit 6 has two empty first seats S1, which are located immediately upstream of the transfer region R2 (these two first seats S1 should have been occupied by the two capsules 2 rejected).

It should be noted that, in FIG. 3, the first fourth seat S4 of a group of fourth seats S4 of the first conveyor unit 8A has received a capsule 2 whilst the other fourth seats S4 of the same group are waiting to receive them, following their movement in the receiving region R3.

Figure 4:
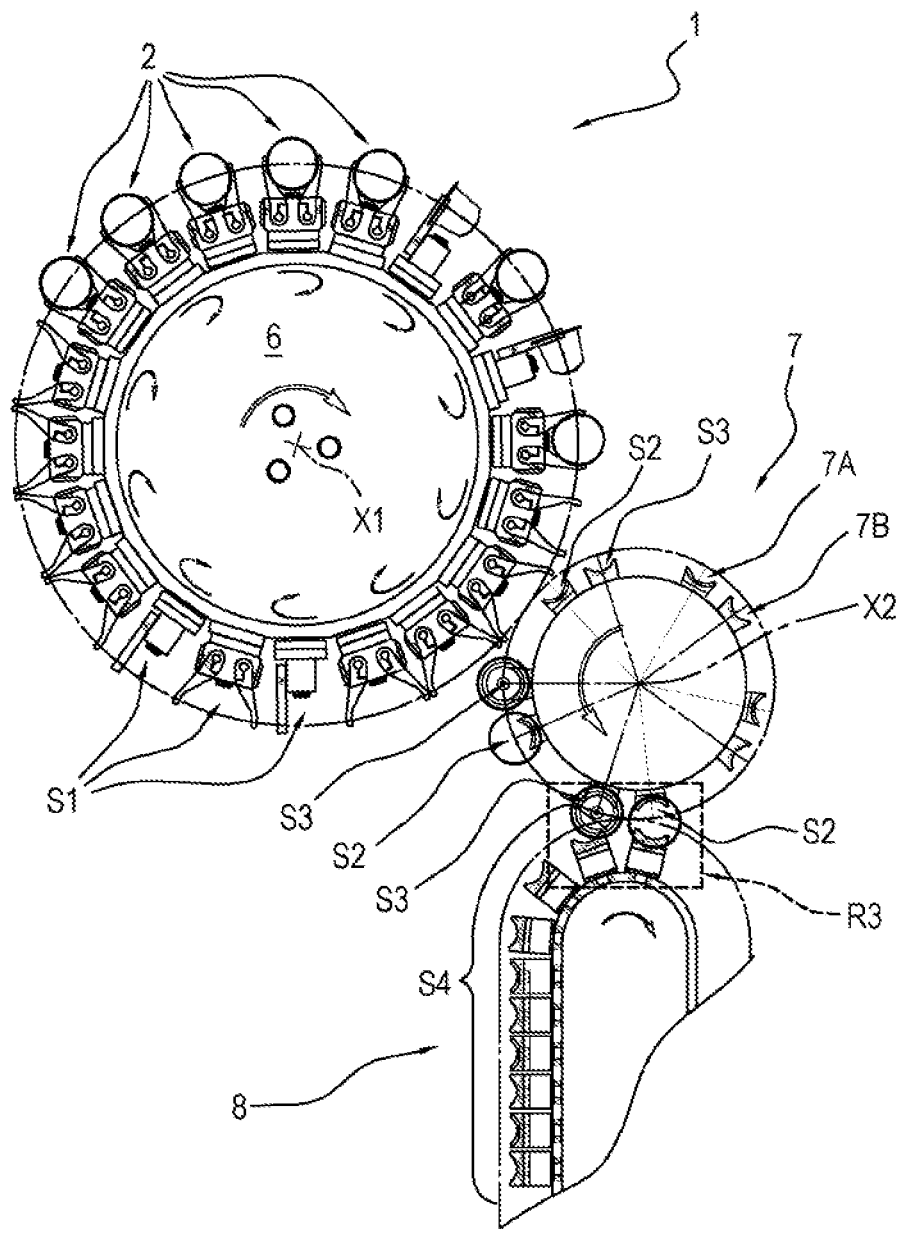

FIG. 4 shows the unit 1 at a subsequent point in time relative to FIG. 3: it should be noted that, in the period of time between FIGS. 3 and 4, both the first rotary element 7A and the second rotary element 7B have been rotated (but at different operating speeds).

More specifically, the first rotary element 7A, in the period of time between FIGS. 3 and 4, has been rotated at a speed lower than that of the second rotary element 7B, which, on the other hand, has been accelerated for delivering the capsule 2 to the second fourth slot S4 of the group of seats S4 of the first conveyor unit 8A.

Consequently, the last capsule 2 collected by the third seat S3 of the second rotary element 7B is moved close to the capsule 2 (collected by the second seat S2 of the first rotary element 7A) which precedes it relative to the direction of rotation W of the second rotary unit 7.

Preferably, the first rotary unit 6 is driven at a constant speed of rotation (since it must be synchronised, that is, operate in phase relationship, with the transport element 4, which is preferably operated at a constant speed).

Figure 5:
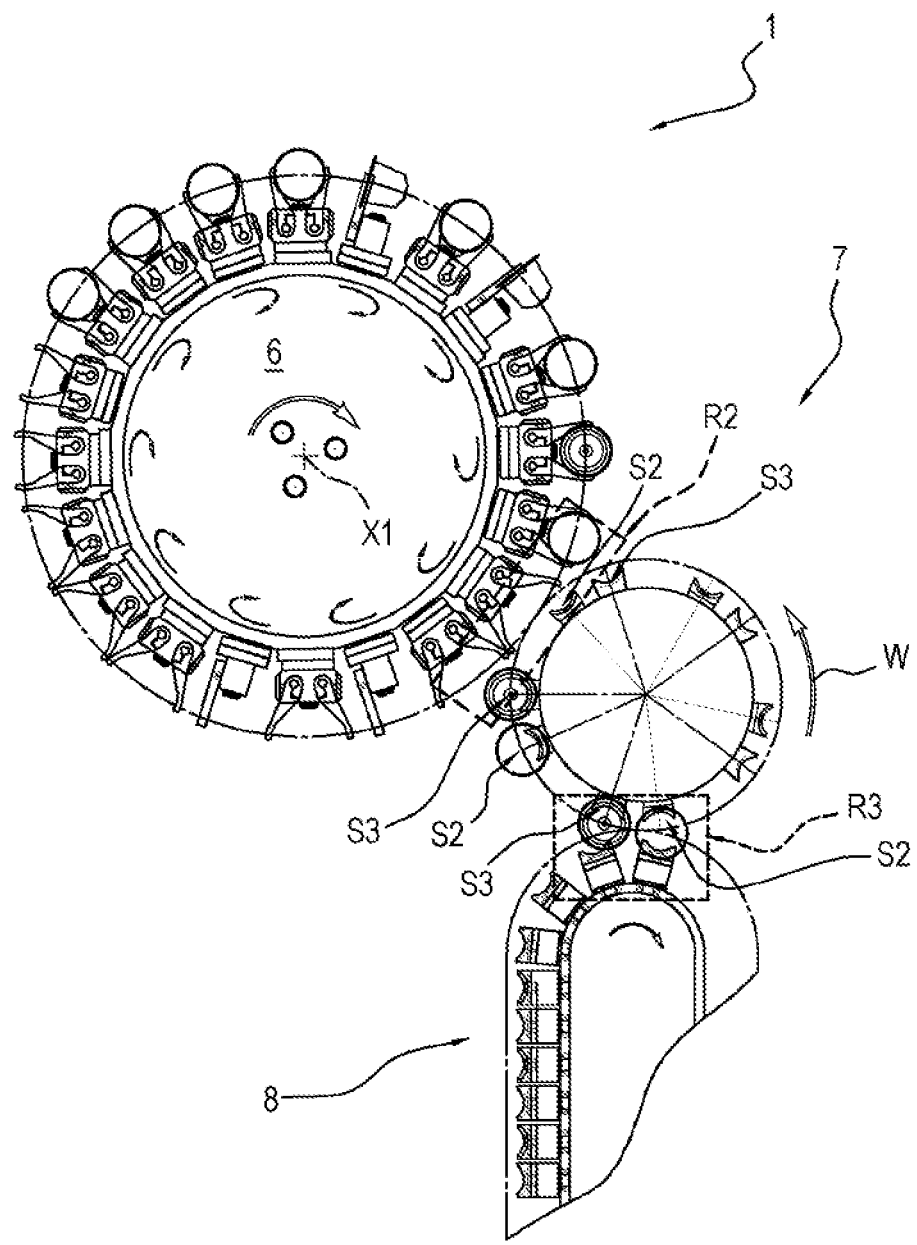

FIG. 5 shows a subsequent moment in time, wherein the first rotary unit 6 has undergone, relative to the moment in time of FIG. 4, a further rotation whilst the grouping together and aligning line 8 and the first and the second rotary element (7A, 7B) are substantially in the same position.

It should be noted that the second rotary unit 7 is waiting for the first rotary unit 6 to carry, in the transfer region R2, a capsule 2, for receiving it in the second seat S2 of the first rotary element 7A waiting.

Figure 6:
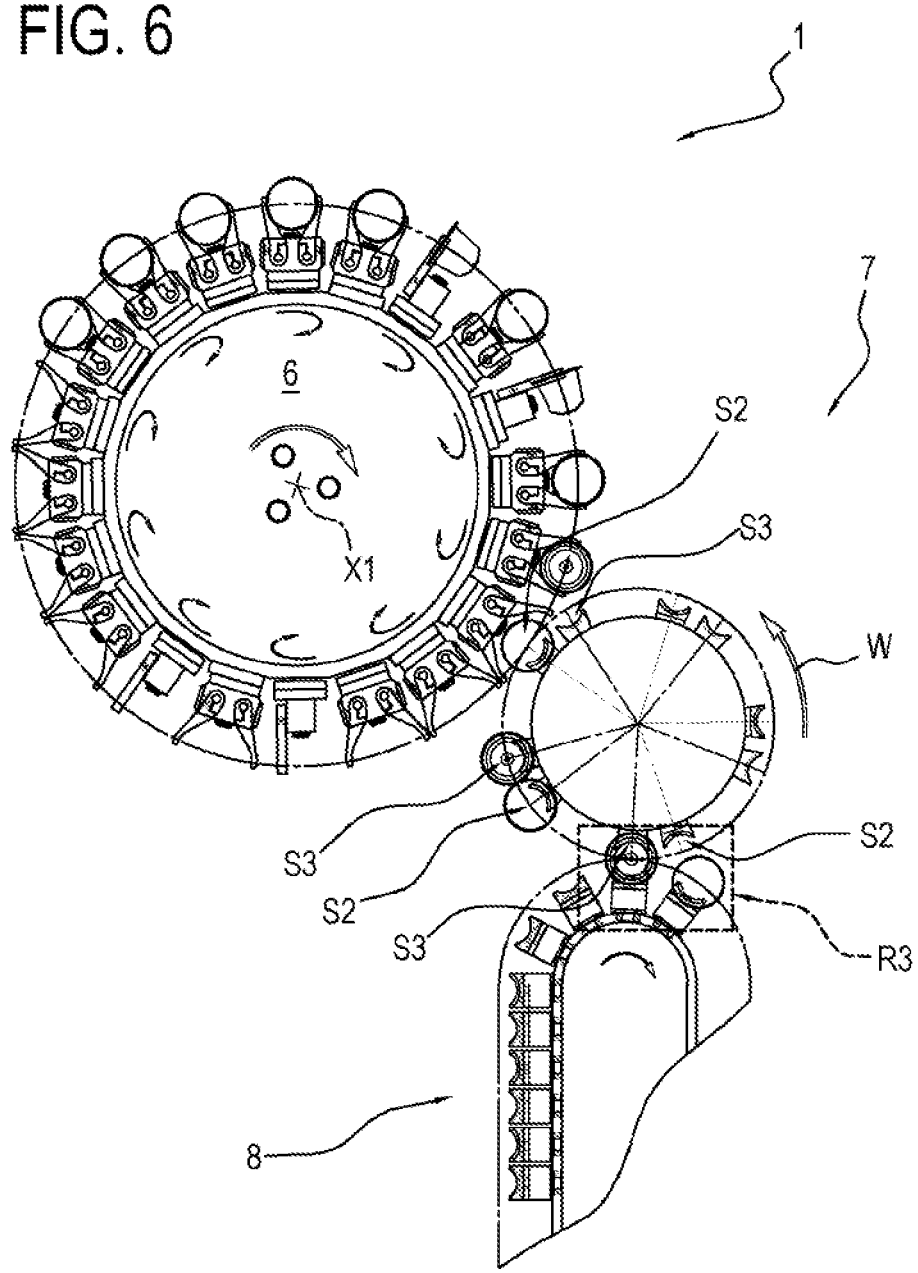
Figure 7:
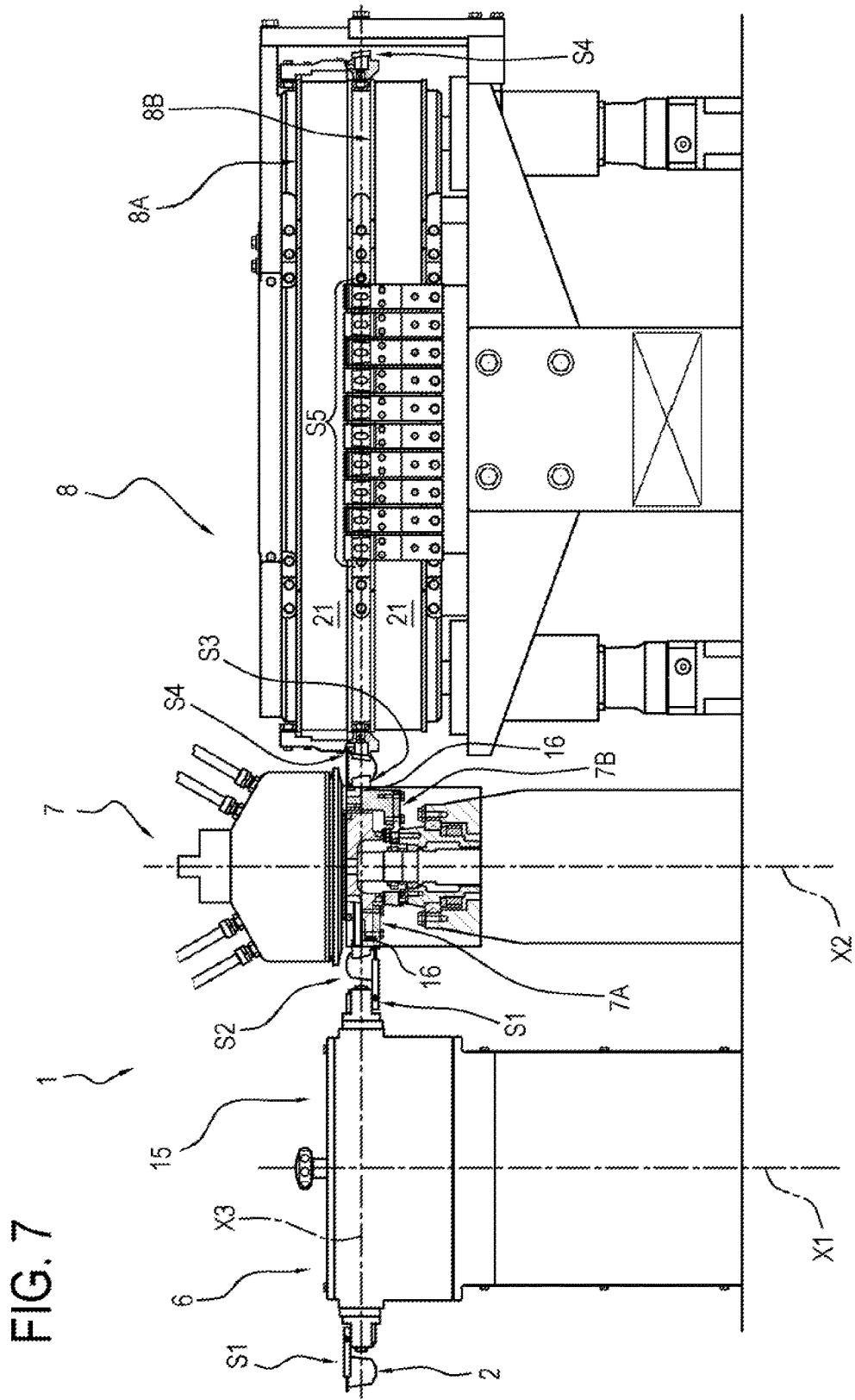
FIG. 7 is a schematic side view of the unit for grouping together and aligning capsules of the preceding drawings.

FIG. 6 shows a subsequent moment in time relative to FIG. 5, wherein the second seat S2 of the first rotary element 7A in the transfer region R2 has received a further capsule 2 from the first rotary element 6.

It should also be noted that, in FIG. 6, the first rotary element 7A has completed the transfer of the capsule in the transfer region R3 to the first fourth seat S4 of the group of fourth seats S4 of the first conveyor unit 8A and, moreover, the second rotary element 7B is transferring a capsule 2 to the second fourth seat S4 of the group of fourth seats S4 the first conveyor unit 8A.

An advantage of this invention is that of having provided a unit 1 for grouping together and aligning capsules 2 which is particularly simple and which is able to operate at high speed.

Moreover, another advantage of this invention is that of having provided a unit 1 for grouping together and aligning capsules 2 which is able to operate correctly, at high speeds, even in the presence of a rejection of at least one capsule, advantageously a rejection of two consecutive capsules.

The invention also defines a method for grouping together and aligning capsules 2 to be placed inside multi-capsule packages placed side by side and alternately rotated by 180°, that is according to a head-tail orientation, with the capsules (2) comprising a rigid body 3 comprising a base 30 and an upper opening 31 provided with an outer edge 32, a dose 33 of extraction or infusion product contained in the rigid body 3, and a closing sheet 34, joined to the outer edge 32 for closing the upper opening 31.

The method comprises the following steps:
preparing a first rotary unit 6, provided with a plurality of first seats S1 for receiving capsules 2 and designed to rotate, preferably continuously, about a first axis of rotation X1 and to receive the capsules 2 from a transport element 4 of a machine 100 for forming capsules 2;
preparing a second rotary unit 7 designed to rotate about a second axis of rotation X2, equipped with a first rotary element 7A, designed to rotate, preferably at a variable speed, about the second axis of rotation X2 and equipped with respective second seats S2 for receiving capsules 2, and a second rotary element 7B, designed to rotate, preferably at variable speed, about the second axis of rotation X2 and equipped with respective third seats S3 for receiving capsules 2, with the first and second rotary elements (7A, 7B) which can be rotated independently in the same direction W of rotation about the second axis of rotation X2;
preparing at least one grouping together and aligning line 8 designed to group together and align capsules 2 and comprising a first conveyor unit 8A equipped with fourth seats S4 for receiving capsules 2 and a second conveyor unit 8B equipped with fifth seats S5 for receiving capsules;
placing capsules 2 inside the first seats S1 of the first rotary unit 6;
rotating, about a horizontal radial axis X3, a part of the capsules 2 so as to position, in the first seats S1 of the first rotary element 6, capsules 2 placed alongside each other and rotated by 180°, that is to say, with the bottom 30 facing in opposite directions;
transferring the capsules 2 from the first seats S1 of the first rotary unit 6 to the first rotary element 7A and to the second rotary element 7B, in alternating succession (that is, once a capsule 2 is transferred to the first rotary element 7A the next capsule is transferred to the second rotary element 7B, and so on);
rotating the first and second rotary element (7A, 7B) each independently of the other, to release in alternating succession (that is, once a capsule 2 is released from the first rotary element 7A the next capsule 2 is released from the second rotary element 7B, and so on) the capsules 2 to the fourth seats S4 of the first conveyor unit 8A and to the fifth seats S5 the second conveyor unit 8B;
aligning the capsules 2 on the fourth seats S4 and fifth seats S5, in such a way as to create groups of capsules 2 rotated between each other by 180°, that is to say, with the bottom 30 facing in opposite directions;

moving the fourth seats S4 and fifth seats S5 for releasing the groups of capsules 2 in a delivery region 20, the capsules 2 of a group being aligned, grouped together and positioned with head-tail orientation at the delivery region 20.

Preferably, according to another aspect, the method comprises a step of transferring the groups of capsules 2 from the delivery region 20 into a multi-capsule package, advantageously a box.

According to another aspect, the method comprises the following steps:

detecting at least one quality parameter regarding a qualitative state of the capsules conveyed by the transport element;

rejecting, upstream of the second rotary unit 7, a pair of capsules 2, side by side, of which at least one is not acceptable in terms of quality on the basis of the quality parameter detected such that the first rotary unit 6 has two adjacent first seats S1 empty;

slowing down or stopping the first or second rotary element (7A, 7B) having a corresponding second (S2) or third seat (S3) empty positioned in the transfer region R2, or upstream of the transfer region R2, waiting to receive a capsule 2, and slowing down or stopping the first or second conveyor unit (8A, 8B) having at least a corresponding fourth (S4) or fifth (S5) seat empty positioned in the receiving region R3, or upstream of the receiving region R3, waiting to receive a capsule 2 from the first or second rotary element (7A, 7B);

transferring a capsule 2 from the first rotary unit 6 to the second S2 or third S3 seat of the above-mentioned first or second rotary element 7A, 7B previously slowed down or stopped;

accelerating the first or second rotary element (7A, 7B) previously slowed down or stopped to place the capsule 2 present in the second or third seat (S2, S3) of the first or second rotary element (7A, 7B) previously slowed down or stopped at a predetermined distance from an adjacent third or second seat (S3, S2) of the second or first rotary element (7B, 7A), respectively, located downstream relative to the direction of rotation (W) of the first or second rotary element (7A, 7B), so as to define a pair of capsules (2) alongside each other and alternately rotated by 180°;

accelerating the first or second rotary unit (8A, 8B) previously slowed down or stopped to receive a capsule from the first or second rotary element (7A, 7B) previously slowed down;

releasing the capsules 2 of the pair of capsules 2 alongside each other and alternately rotated by 180° to the grouping together and aligning line 8 so as to create, on the transfer line 8 a group of capsules 2 (that is, a predetermined number of capsules 2 designed to be placed simultaneously in a box).

According to the above mentioned aspect, the method preferably comprises a step of inserting the group of capsules 2 in a box.

According to another aspect, the step of rejecting, upstream of the second rotary unit 7, a pair of capsules 2 placed side by side is carried out upstream of the first rotary unit 6.

According to yet another aspect, the step of rejecting, upstream of the second unit 7, a pair of capsules 2 placed side by side is performed at the transport element 4.

According to a further aspect, the step of rejecting, upstream of the second rotary unit 7, a pair of capsules 2 placed side by side is carried out at the first rotary unit 6.

According to yet another aspect, the step of releasing the capsules 2 of the pair of capsules 2 positioned alongside each other and alternately rotated by 180° to the grouping together and aligning line 8, so as to create a group of capsules 2, comprises a step of releasing, by the first rotary element 7A, a capsule 2 to the grouping together and aligning line 8 and a subsequent step of releasing, by the second rotary element 7B, a capsule 2 to the grouping together and aligning line 8.

According to yet another aspect, the step of moving the fourth and fifth seats (S4, S5) of the grouping together and aligning line 8 comprises a step of moving independently a first group of fourth seats S4 and a second group of fifth seats S5 of the grouping together line 8, in phase with the first or second rotary element (7A, 7B).

According to another aspect, the invention also relates to a machine 100 (illustrated in FIG. 1) which is designed to produce capsules 2, of the disposable type, for extraction or infusion beverages. The machine 100 comprises the unit 1 described above.

The machine 100 comprises the transport element 4 designed to move the capsule 2 being formed through a plurality of operating stations through an operating path along a direction of forward movement.

In a minimum configuration, the machine 1 comprises a feed station SA for feeding the rigid containers 3 in corresponding seats 5 of the transport element 4, a dosing station SD for filling a dose 33 of product inside respective rigid containers 3, and a sealing station SC for closing the upper opening 31 of the rigid container 3 with a respective sealing sheet 34.

Depending on the type of capsule 2 to be formed, the machine 100 may also comprise, along the operating path, further stations, for example one or more stations for feeding filtering elements and/or distributing elements, one or more stations for forming filtering elements and/or distributing elements, one or more stations for cutting filtering elements and/or distributing elements and/or sealing sheets, one or more weighing and control stations.

Preferably, the predetermined portion R1 of the conveying path P is a curved portion of the transport element 4.

The invention claimed is:

1. A unit for grouping together and aligning capsules for extraction or infusion products in multi-capsule packages, comprising:

a first rotary unit, configured to rotate about a first axis of rotation and including a plurality of first seats for receiving capsules configured to receive a corresponding capsule from a transport element of a machine for forming capsules, at least a part of the first seats being configured to rotate about a respective horizontal radial axis to modify an orientation of the capsules;

a second rotary unit configured to rotate about a second axis of rotation, acting in conjunction with the first rotary unit to receive from the first rotarty unit capsules in a predetermined transfer region, equipped with a first rotary element configured to rotate about the second axis of rotation and including respective second seats for receiving capsules, and a second rotary element configured to rotate about the second axis of rotation and including respective third seats for receiving capsules, with the first and second rotary elements being rotatble independently in a same direction of rotation for picking up alternatively and in succession, capsules from the first rotary element;
at least one grouping together and aligning line configured to group together and align capsules, acting in conjunction with the second rotary unit for receiving, in a receiving region, capsules alternatively from the first and second rotary element so as to form a group of capsules in a delivery region.

2. The unit according to claim 1, comprising at least one sensor configured to detect at least one quality parameter of the capsules and to control a rejection station, configured for rejecting capsules which do not conform on a basis of the at least one quality parameter detected by the at least one sensor, the rejection station being located upstream of the second rotary unit.

3. The unit according to claim 2, comprising a control and actuator unit, operatively connected to, and configured to control, the first rotary unit, the second rotary unit, and the grouping together and aligning line, at least one chosen from the first rotary element and the second rotary element being controlled by the control and actuator unit as a function of the at least one quality parameter detected by the at least one sensor according to a speed of rotation variable at least at a same time or after a movement, in the transfer region, of a first seat of the first rotary unit which is empty on account of a capsule rejected in the rejection station.

4. The unit according to claim 3, wherein the control and actuator unit is configured to slow down the speed of rotation of at least one chosen from the first rotary element and the second rotary element at the same time as the movement in the transfer region of a first seat of the first rotary unit which is empty on account of a capsule rejected in the rejection station.

5. The unit according to claim 1, wherein the second seats and third seats, respectively, of the first rotary element and the second rotary element are radial seats.

6. The unit according to claim 1, wherein the grouping together and aligning line comprises a first conveyor unit including with fourth seats for receiving capsules and a second conveyor unit including with fifth seats for receiving capsules, the first conveyor unit and the second conveyor unit being configured to move, respectively, the fourth seats and the fifth seats along a closed path between the delivery region and a reception region alternately between each other, the first conveyor unit and the second conveyor unit being rotatable independently of one another in a same direction.

7. The unit according to claim 1, comprising a first actuator configured to rotate the first rotary element and a second actuator configured to rotate the second rotary element.

8. A method for grouping together and aligning capsules to be placed inside multi-capsule packages placed side by side and alternately rotated by 180°, according to a head-tail orientation, with the capsules comprising a rigid body comprising a base and an upper opening having an outer edge, a dose of extraction or infusion product contained in the rigid body, and a closing sheet, joined to the outer edge for closing the upper opening, the method comprising the steps of:
preparing a first rotary unit, provided with a plurality of first seats for receiving capsules and configured to rotate about a first axis of rotation and to receive the capsules from a transport element of a machine for forming capsules;
preparing a second rotary unit configured to rotate about a second axis of rotation, including a first rotary element, configured to rotate about the second axis of rotation and including respective second seats for receiving capsules, and a second rotary element, configured to rotate about the second axis of rotation and including respective third seats for receiving capsules, with the first and second rotary elements being rotatable independently in a same direction of rotation about the second axis of rotation;
preparing at least one grouping together and aligning line configured to group together and align capsules and comprising a first conveyor unit including fourth seats for receiving capsules and a second conveyor unit including fifth seats for receiving capsules;
placing capsules inside the first seats of the first rotary unit;
rotating, about a horizontal radial axis, a part of the capsules to position, in the first seats of the first rotary element, capsules placed alongside each other and rotated by 180°, with the bottoms facing in opposite directions;
transferring the capsules from the first seats of the first rotary unit to the first and to the second rotary element, in alternating succession;
rotating the first and second rotary element, each independently of the other, to release in alternating succession the capsules to the fourth seats of the first conveyor unit and to the fifth seats of the second conveyor unit;
aligning the capsules on the fourth seats and fifth seats, to create groups of capsules rotated between each other by 180°, with the bottoms facing in opposite directions;
moving the fourth seats and fifth seats for releasing the groups of capsules in a delivery region, the capsules of each group being aligned, grouped together and positioned with head-tail orientation at the delivery region.

9. The method according to claim 8, comprising the following steps:
detecting at least one quality parameter regarding a qualitative state of the capsules conveyed by the transport element;
rejecting, upstream of the second rotary unit, a pair of capsules, side by side, of which at least one is not acceptable in terms of quality based on the at least one quality parameter detected such that the first rotary unit has two adjacent first seats empty;
slowing down or stopping the first or second rotary element having a corresponding second or third seat empty positioned in the transfer region, or upstream of the transfer region, waiting to receive a capsule, and slowing down or stopping the first or second conveyor unit having, respectively, at least a fourth or fifth seat empty positioned in a receiving region, or upstream of the receiving region, waiting to receive a capsule from the first or second rotary element,
transferring a capsule from the first rotary unit to the corresponding second or third seat of the first or second rotary element previously slowed down or stopped;
accelerating the first or second rotary element previously slowed down or stopped to place the capsule present in the second or third seat of the first or second rotary element previously slowed down or stopped at a predetermined distance from a third or second seat of the second or first rotary element, respectively, located downstream relative to the direction of rotation of the first and second rotary element, so as to define a pair of capsules alongside each other and alternately rotated by 180°;

accelerating the first or second conveyor unit previously slowed down or stopped to receive a capsule from the first or second rotary element previously slowed down or stopped;

releasing the capsules alongside each other and alternately rotated by 180° to the grouping together and aligning line so as to create on the grouping together and aligning line a group of capsules.

10. The method according to claim 9, wherein the step of rejecting, upstream of the second rotary unit, a pair of capsules alongside each other is performed at the transport element.

11. The method according claim 9 or 10, wherein the step of releasing the capsules positioned alongside each other and alternately rotated by 180° to the grouping together and aligning line, to create a group of capsules, comprises a step of releasing, by the first rotary element a capsule to the grouping together and aligning line and a subsequent step of releasing, by the second rotary element, a capsule to the grouping together and aligning line.

12. The method according to claim 8, wherein the step of moving the fourth seats of the first conveyor unit and the fifth seats of the second conveyor unit comprises a step of moving independently a first group of fourth seats and a second group of fifth seats, in phase with the first or second rotary element.

13. The method according to claim 8, comprising a step of transferring the groups of capsules from the delivery region inside a multi-capsule package.

* * * * *